Nov. 29, 1960 — G. C. TERRY — 2,961,942
FIREPLACE GRILL
Filed Oct. 22, 1958 — 2 Sheets-Sheet 1
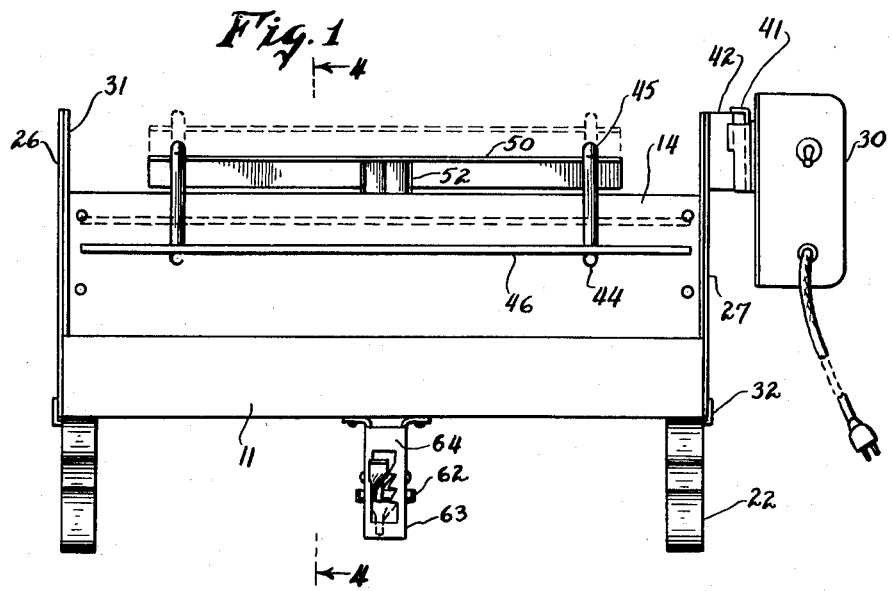
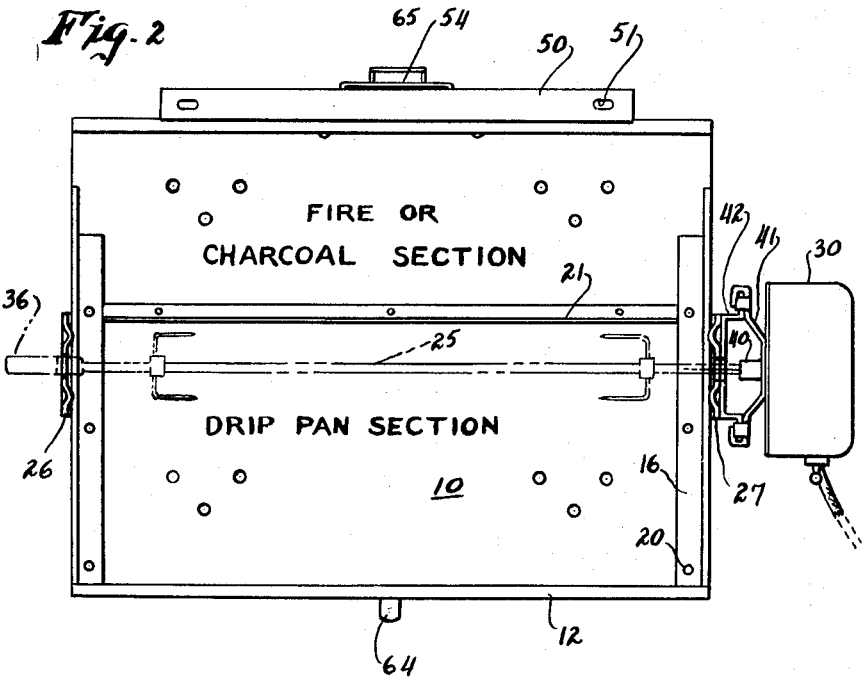
INVENTOR.
GEORGE C. TERRY
BY John P. Chandler
his ATTORNEY

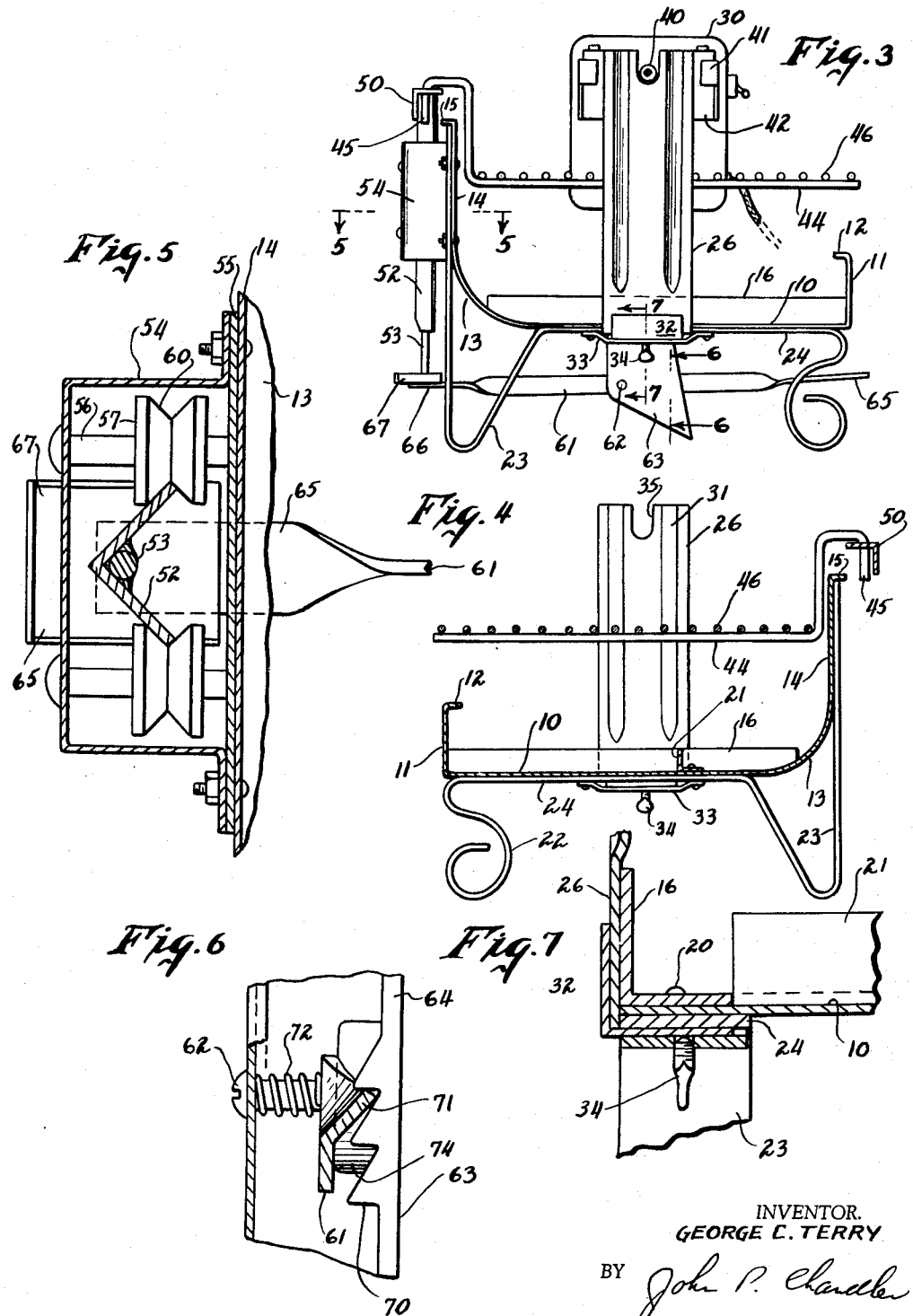

United States Patent Office 2,961,942
Patented Nov. 29, 1960

2,961,942

FIREPLACE GRILL

George C. Terry, Garden City, N.Y., assignor to Kamkap, Inc., New York, N.Y., a corporation of New York Filed Oct. 22, 1958, Ser. No. 768,918

1 Claim. (Cl. 99—340)

This invention relates to charcoal grills and relates more particularly to a novel grill especially designed for use in a fireplace.

Charcoal grills are generally designated for outdoor use during the summertime, although inclement weather usually forces the operation to be performed indoors and during winter months the outdoor barbecue is not feasible.

An important object of the present invention is to provide a grill having a grid for steaks and chickens and also a rotisserie arrangement for roasts and whole fowl which is engineered to readily fit within the confines of a fireplace so that the cooking operation can be performed under cover, as it were. The grill of the present invention may with equal facility be moved to out-of-doors and thus serve a dual function. Also, as a fireplace apparatus, it may be used as a support for burning logs in place of conventional andirons.

Another object of the present invention is to provide a grill of this character with a grid for broiling steaks and the like wherein the grill is vertically movable to an adjusted, fixed position without, however, causing the user to burn his fingers in making the adjustment during the cooking operation.

To this end the grill support comprises a frame readily movable upwardly to a desired position merely by depressing a foot treadle located at the forward section of the bed. Release of the treadle for downward movement of the grid in desired increments is effected with equal facility.

A further object of the invention is to provide a novel support for a motor driven spit which can be used without the grid and wherein means are provided for confining the burning charcoal to a rearward section of the bed where the heat is reflected forwardly and upwardly to the meat on the rotating spit. The drippings from the meat or fowl do not, however, fall on the burning embers which avoids flames and consequent charring of the meat.

Yet another object of the invention is to provide a grill of the character described where in the several component parts may be dismantled and placed within the confines of the bed for shipping or storing.

In the drawings:

Fig. 1 is a front elevation of the fireplace grill of the present invention.

Fig. 2 is a plan view thereof.

Fig. 3 is an end elevation with the motor removed.

Fig. 4 is a section taken on line 4—4 of Fig. 1.

Fig. 5 is a broken section taken on line 5—5 of Fig. 3.

Fig. 6 is a broken section taken on line 6—6 of Fig. 3.

Fig. 7 is a broken section taken on line 7—7 of Fig. 3.

The bed 10 of the grill may be formed from relatively heavy gauge sheet metal and the bed has an upwardly turned flange 11 along its forward edge with a narrow inturned flange 12 at its upper end. At its rear the bed has an upwardly curved section 13 and a relatively high rear wall section 14 terminating in a narrow rearwardly turned flange 15. Shallow end walls 15 may be formed from angle brackets 16 whose horizontal portions are shown as secured to the bed by rivets 20. An angle bar 21 extends longitudinally of the bed about two thirds the distance back from the front edge for a purpose to be described.

The bed may be supported in spaced relation to a fireplace by suitable leg structures which in this instance are shown as formed from a single length of metal strip having an ornamental curved front leg section 22 and a substantially V-shaped rear leg section 23 extending up to the top of and reinforcing the high rear wall 14 of the bed, the two leg sections being connected by a horizontal section 24 underlying and reinforcing the ends of the bed. The several angles and leg sections may be secured to the bed by spot welding or by bolts or rivets.

The rotating spit 25 shown in broken lines in Fig. 4 is supported by upstanding frames 26 and 27, the latter supporting a motor 30. Each frame may have vertical corrugations 31 for strengthening the same and at its lower end there is welded an angle bracket 32 whose horizontal portion is received in a slot formed between horizontal section 24 of the leg structure and an elongated bracket 33. A set screw 34 secures this horizontal bracket portion within its supporting slot and the spit-supporting frames can be dismantled for shipping or storage.

Frame 26 at the left end has a U-shaped slot 35 to receive one end of the non-circular rotating spit and this end of the spit has a handle 36 while the opposite end of the spit is received in an non-circular socket 40 on the drive shaft of motor 30. The motor has a mounting bracket 41 interfitting with a fixed bracket 42 at the upper end of the vertical frame 27. It will be noted that angle bar 21 is positioned a few inches to the rear of spit 25 (Fig. 2). This bar forms a barrier limiting forward movement of the charcoal and the curved rear section of the bed as well as its rear wall reflect the heat upwardly and forwardly to the roast or fowl being broiled. In all such instances there is an inevitable dripping of the fat which in this instance does not fall on the fire which would tend to burn or sear the meat rather than broil it without burning. Openings 43 in the drip pan section permit these drippings to pour below the bed or, if desired, a separate drip pan may simply be placed on the drip pan section.

A grid on which steaks or chops may be broiled is formed from two spaced transverse wire frames 22 having upwardly extending, inverted U-shaped terminals 45, and form a plurality of longitudinal bars 46. The grid is supported by a T-shaped frame whose horizontal section 50 (Fig. 2) is an angle bar and has two spaced openings 51 which receive the vertical termini 45 of the U-shaped section of frames 44. The vertical component of the T-shaped frame is another angle bar 52 secured diagonally at the upper end of bar 50 and a rod 53 is welded in the center of the V-shaped channel. A U-shaped sheet metal frame 54 (Fig. 5) and a base plate 55 are secured to the rear face of rear wall 14 of the bed and the two spaced walls support pairs of spaced upper and lower pins 56 on which rollers 57 with V-shaped annular grooves 60 are mounted for free rotation. Vertical frame member 52 is supported on opposite sides in said grooved roller for free up-and-down travel.

Rod 53 and the T-shaped frame secured thereto are moved upwardly and downwardly to an adjusted, fixed position by a flat lever 61 centrally pivoted at 62 in a bracket 63 having a front wall 64 secured at the center of the under face of bed 10. The ends of lever 61 are twisted 45° to form a foot treadle 65 at the forward end and a flat portion 66 at the rear end to which a square flanged plate 67 is secured on which rod 53 rests.

As will be noted in Figs. 1 and 6 a goodly portion of front wall 64 of bracket 63 is cut away to form on one side thereof a plurality of ratchet teeth 70 which are successively engaged by a pawl section 71 of lift lever 61. The walls of bracket 63 are spaced apart considerably more than the thickness of lever 61 and the lever is urged sideways in the direction of the teeth by a coiled spring 72 carried on pivot pin 62. The lever is held more or less centered by a spacer 74.

To raise the grid it is only necessary to depress treadle 65 in small increments and to lower the grid the treadle is moved to the left to allow upward travel free from teeth 70.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claim, and that all modifications that come within the meaning and range of equivalency of the claim are intended to be included therein.

What I claim is:

A charcoal grill suitable for insertion within a fireplace and including a generally flat horizontal bed provided at its rear with an upwardly curved section terminating in a rear vertical wall, and provided with shallow side and front walls, a grid positioned above the bed and a frame mounted for sliding vertical movement behind the rear wall supporting said grid, a lever centrally pivoted below the bed and provided with a foot treadle at its forward end and a flat section at its rear end supporting the lower end of said frame, frames detachably secured at opposite ends of the bed substantially in the center thereof and having openings extending downwardly from their upper ends, and a rotisserie spit mounted in said openings and a motor carried by one of said frames having a driving connection with said spit, and a barrier extending longitudinally of the bed to the rear of the spit axis to confine burning charcoal to the rear of said barrier.

References Cited in the file of this patent

UNITED STATES PATENTS

| | | |
|---|---|---|
| 1,530,063 | Tichy | Mar. 17, 1925 |
| 2,325,828 | Betts | Aug. 3, 1943 |
| 2,372,751 | Trick | Apr. 3, 1945 |
| 2,501,104 | Smith | Mar. 21, 1950 |
| 2,506,698 | Beals | May 9, 1950 |
| 2,723,658 | Schmieding | Nov. 15, 1955 |
| 2,797,633 | Goodwin | July 2, 1957 |
| 2,845,856 | Sack | Aug. 5, 1958 |

FOREIGN PATENTS

| | | |
|---|---|---|
| 136,879 | Germany | Oct. 9, 1901 |
| 23,745 | Austria | Apr. 10, 1906 |